Figure 5:
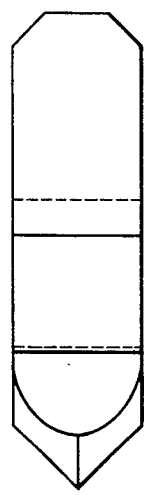

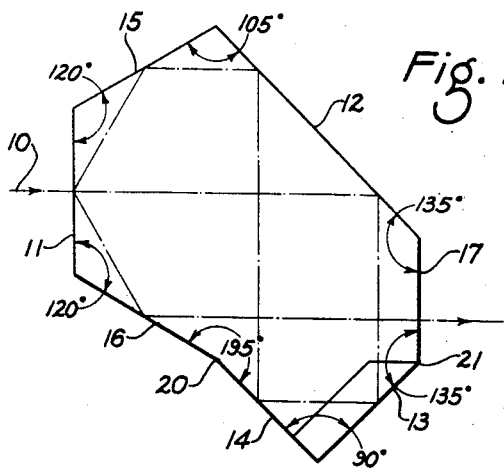
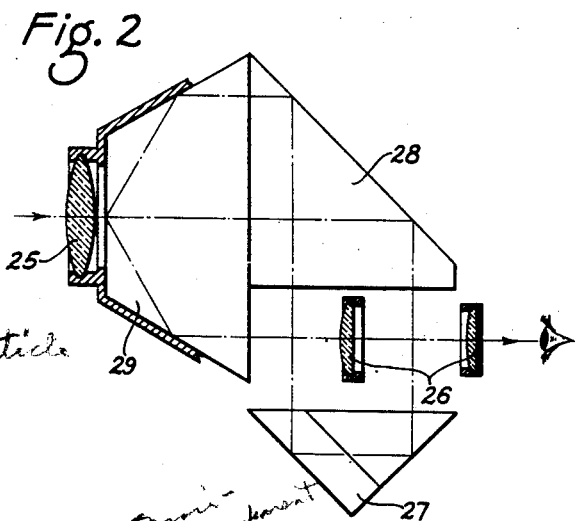
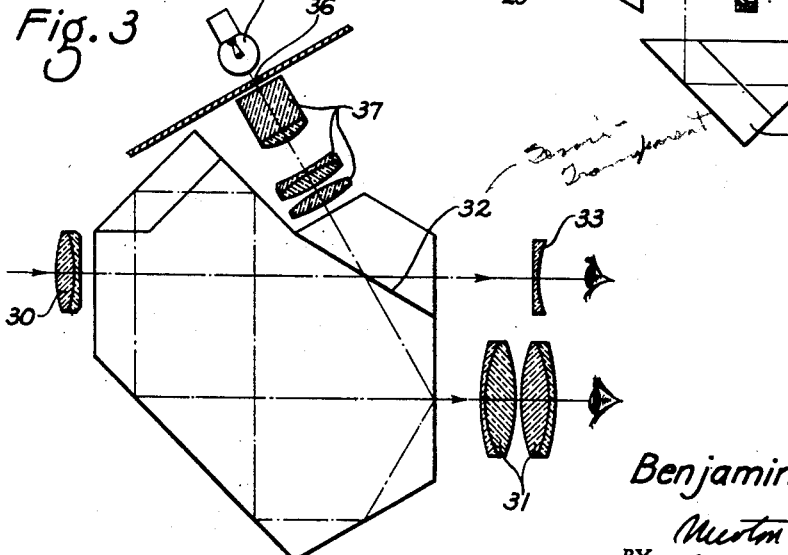

June 7, 1949.   B. E. LUBOSHEZ   2,472,600
OPTICAL ERECTING PRISM FOR FOLDING A LIGHT PATH
Filed March 30, 1946   2 Sheets-Sheet 2

Benjamin E. Luboshez
INVENTOR

Patented June 7, 1949

2,472,600

UNITED STATES PATENT OFFICE 2,472,600

OPTICAL ERECTING PRISM FOR FOLDING A LIGHT PATH

Benjamin E. Luboshez, Rochester, N. Y., assignor to Eastman Kodak Company, Rochester, N. Y., a corporation of New Jersey Application March 30, 1946, Serial No. 658,383

2 Claims. (Cl. 88—1)

This invention relates to optical systems and particularly to prisms for use in optical systems. Specifically this invention relates to a modification of the prism system described in my copending application Serial No. 658,382 filed concurrently herewith and issued as Patent 2,466,455 April 5, 1949. The object of the present invention is to provide a long optical path in an optical system and at the same time to produce both inversion and reversion of the image.

In one embodiment of the invention the prism is a solid block of light refractive material such as glass, preferably made up by cementing separate units together. On the other hand the prism system may include airspaces between the units of the system but the system is effectively the same shape as before. In defining a particular prism system through which light may pass in either direction it is usually clearer if the orientation of reflecting surfaces is described with respect to the reflection of the optic axis, especially in very complicated systems such as those with which the present invention is concerned. Obviously the orientation of a reflecting surface is fully described as soon as one describes how the optic axis is reflected at the point at which it strikes the surface. There is one roof reflector involved in the present prism system and the optic axis is considered as going to the roof edge. If the light beam is symmetrical about this optic axis, the two halves of the beam cross over at the roof edge, but it is not uncommon to use roof systems in which the beam is entirely on one side of such an optic axis until it reaches the roof at which it is reflected entirely to the other side of the optic axis. Since the present prism system may be used either way it will be defined with respect to the optic axis just discussed even though it may be used with the light beam first entirely on one side and then entirely on the other side about this axis.

According to the invention a prism system is made up which can be defined with respect to parallel sides. The system has entrance and exit faces perpendicular to the sides and orthogonal to the optic axis of the system as the axis passes through these faces. There is one roof reflecting surface with its roof edge parallel to the sides and coplanar with the optic axis as defined above. The system also has a plurality of plane reflecting surfaces all perpendicular to the sides of the system for reflecting the optic axis coplanarly each time. That is the optic axis always remains in one plane. One of the surfaces reflects the optic axis twice. Throughout this specification and the accompanying claims, the phrase "reflect the optic axis" means:—bend the optic axis by reflection and in accordance with the laws of reflection. The same surface or another one of the series is oriented to receive light through one of the faces (entrance or exit faces) and to reflect it to the other of said faces at greater than the critical angle so that the optic axis is reflected once at this other one of the faces. Actually of course light enters the system through the entrance face but the orientation of any surface may be described with respect to light coming in either way. When the entrance and exit faces are parallel, the surface which reflects light from one face to the other is at 120° to said other face. That is the light enters the entrance face and is next reflected to the exit face to be totally internally reflected thereat, or alternatively just before it emerges from the exit face it is totally internally reflected at the entrance face to suffer just one more reflection before emerging.

In certain embodiments of the invention it is preferable to have one of the reflecting surfaces semi-transparent to act as a beam compounder, i. e. to split the beam into two or to combine an extraneous beam with the one traveling through the prism system.

The invention will be fully understood from the following description when read in connection with the accompanying drawings in which:

Fig. 1 is an axial cross section of a prism system according to the invention.

Fig. 2 similarly shows a telescopic system incorporating a modification of this prism system.

Fig. 3 similarly shows a modification of the invention used as a duplex telescopic gunsight.

Figure 4:
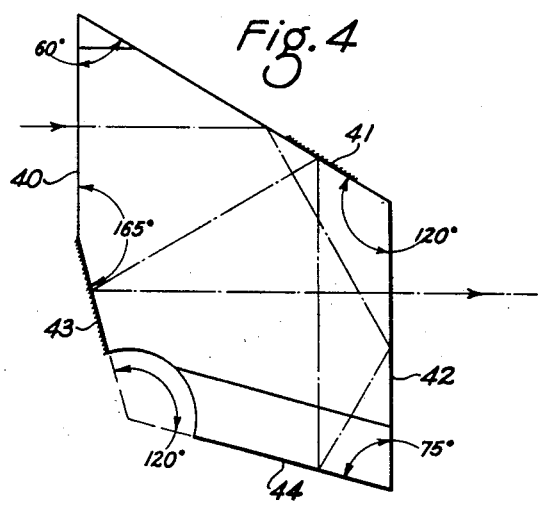
Figure 6:
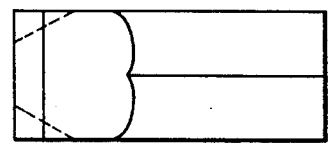

Figs. 4, 5, and 6 are respectively plan, elevation, and side views of a modification of my prism system.

Figure 9:
Figure 7:
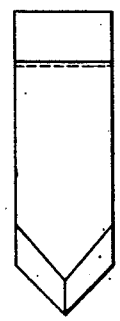
Figure 8:
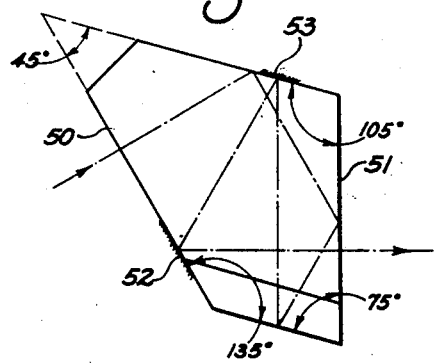

Figs. 7, 8, and 9 similarly show still another modification of the invention.

In Fig. 1 the optic axis 10 represented by a broken line enters the system through entrance face 11 and is reflected at surface 12 to a roof surface 13 thence to surface 14, thence back to surface 12, thence to surface 15, thence to suffer total internal reflection at the entrance face 11, thence to surface 16, finally emerging through exit face 17. In practice it is usually convenient to have this prism made up of at least two parts, there being a cemented surface along the line joining the points 20 and 21.

In Fig. 2 telescopic system including objective 25 and eyepiece 26 is made very compact by the use of the prism system shown in Fig. 1. However, in this case the system is modified to include an airspace in which the eyepiece 26 is mounted. This airspace is between two prisms 27 and 28, the latter of which is cemented to a prism 29. The optical path through the system is essentially the same as before, it being permissible to have the roof edge on either side of the prism 27. The mounting of the eyepiece 26 is such that the two parts are supported by a mount partly below the plane of the drawing and partly above so that the optic axis and the light beam can pass freely transversely through the eyepiece as shown.

In Fig. 3 the whole prism system is turned over as compared to Figs. 1 and 2, with respect to an objective 30 and an eyepiece 31. In other words the total internal reflection occurs at the exit face in Fig. 3 instead of at the entrance face of the system as in Figs. 1 and 2. The essential difference in Fig. 3 is the fact that the surface 32 (corresponding to surface 16 of Fig. 1) is semitransparent. Through this surface, a portion of the direct beam from the objective 30 may pass to a negative eyepiece 33 which forms a relatively low power Galilean telescope with the objective 30. The terrestrial telescopic system formed by the objective 30 and the eyepiece 31 has much higher power of course. The surface 32 also compounds the light beam still further by combining with both portions of the telescopic beam, a reticle beam formed by light from a lamp 35 which illuminates a reticle mark 36 and passes through an objective system 37 (approximately a collimator) which produces a beam having the same convergence (vergency) as the telescope beams at the surface 32. The light from the target and from the reticle can thus be viewed either through the eyepiece 33 at low power or through the eyepiece 31 at high power. This optical system forms a duplex power telescopic gunsight when mounted in proper alignment on a gun.

A somewhat simpler long path prism is shown in Fig. 4 in which the optic axis enters an entrance face 40 and is immediately reflected at a surface 41 to suffer total internal reflection at the exit face 42 of the system. The path of the optic axis after this total internal reflection is somewhat different from that in the other embodiments of the invention and in fact it is the surface 41 in this embodiment which twice reflects the optic axis. Unnecessary portions of the prism may be cut away as shown to provide less weight. As before the angles between the various reflecting surfaces are shown on the drawing. Also, as before any one of the surfaces other than the exit and entrance faces and the surface at which the beam is twice reflected, may be the roof reflector. It is more satisfactory to have the roof at the surface 44 than at the surface 43 which is the only other possibility in view of the fact that these are the only two eligible surfaces as just defined. The surface 43 and at least the part of the surface 41 utilized by the second reflection must be metallized to provide total internal reflection at less than the critical angle.

It is possible to have a still simpler system such as that shown in Fig. 7 if there is no objection to having the entrance and exit faces 50 and 51 not parallel to each other. Depending on the index of refraction of the material and the particular angles employed, it may be necessary to provide a metal coating 52 on part of the entrance face to insure total internal reflection as well as on face 53 in this latter embodiment.

Having thus described various embodiments of my invention I wish to point out that it is limited only by the scope of the accompanying claims.

I claim:

1. A reflecting prism system comprising a roof reflecting surface with a 90° dihedral angle, entrance and exit faces perpendicular to the plane bisecting said dihedral angle, and four internal reflecting surfaces also perpendicular to said bisecting plane, the intersection of said four surfaces and said two faces with the bisecting plane and the roof edge of said roof reflecting surface in said plane forming a seven-sided figure with two angles equal to 120° at each side of one face, two angles equal to 135° at each side of the other face, one angle 105° between one of the 120° and one of the 135° angles and the other two internal angles equal to 90° and 195° respectively.

2. A prism system according to claim 1 in which one of the plane-reflecting surfaces is semitransparent at the angle at which light is reflected at this surface to act as a beam compounder.

BENJAMIN E. LUBOSHEZ.

REFERENCES CITED

The following references are of record in the file of this patent:

UNITED STATES PATENTS

| Number | Name | Date |
|---|---|---|
| 989,852 | Koscinski | Apr. 18, 1911 |
| 1,719,443 | Nichterlein | July 2, 1929 |

FOREIGN PATENTS

| Number | Country | Date |
|---|---|---|
| 485,337 | France | Oct. 8, 1917 |
| 358,868 | Germany | Sept. 15, 1922 |
| 360,996 | Germany | Oct. 9, 1922 |
| 682,044 | Germany | Oct. 6, 1939 |
| 702,662 | Germany | Feb. 13, 1941 |